US007850516B2

(12) United States Patent
Gaidarev et al.

(10) Patent No.: US 7,850,516 B2
(45) Date of Patent: Dec. 14, 2010

(54) PAYOUT DISTRIBUTIONS FOR GAMES OF CHANCE

(75) Inventors: Peter Gaidarev, Malden, MA (US); Jonathan W. Woo, Brookline, MA (US)

(73) Assignee: Oracle International Corp., Redwood Shores, CA (US)

( * ) Notice: Subject to any disclaimer, the term of this patent is extended or adjusted under 35 U.S.C. 154(b) by 606 days.

(21) Appl. No.: 11/171,062

(22) Filed: Jun. 30, 2005

(65) Prior Publication Data

US 2005/0245311 A1 Nov. 3, 2005

Related U.S. Application Data

(63) Continuation of application No. 10/005,217, filed on Dec. 5, 2001, now Pat. No. 6,960,135.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl. .......................................................... 463/16

(58) Field of Classification Search .................. 463/16, 463/17, 18, 19, 20, 25

See application file for complete search history.

(56) References Cited

U.S. PATENT DOCUMENTS

| | | | | |
|---|---|---|---|---|
| 5,531,440 | A * | 7/1996 | Dabrowski et al. | 463/12 |
| 6,033,306 | A * | 3/2000 | De Souza | 463/18 |
| 6,309,307 | B1 * | 10/2001 | Krause et al. | 473/274 |
| 6,328,648 | B1 * | 12/2001 | Walker et al. | 463/20 |
| 6,409,172 | B1 * | 6/2002 | Vancura | 273/256 |
| 6,802,778 | B1 * | 10/2004 | Lemay et al. | 463/42 |
| 6,960,135 | B2 * | 11/2005 | Gaidarev et al. | 463/25 |
| 2002/0132660 | A1 * | 9/2002 | Taylor | 463/16 |
| 2002/0147670 | A1 * | 10/2002 | Lange | 705/35 |
| 2003/0100356 | A1 * | 5/2003 | Brown et al. | 463/9 |
| 2005/0020335 | A1 * | 1/2005 | Weiss | 463/9 |
| 2007/0004502 | A1 * | 1/2007 | Walker et al. | |

* cited by examiner

*Primary Examiner*—Pierre E. Elisca
*Assistant Examiner*—Reginald A Renwick

(57) ABSTRACT

Based on a metric that represents a value of a game of chance, a payout distribution is optimized with respect to the metric.

29 Claims, 5 Drawing Sheets

PAYOUT DISTRIBUTIONS FOR GAMES OF CHANCE

This application is a continuation of U.S. patent application No. 10/005,217, filed Dec. 5, 2001, entitled "Payout Distributions for Games of Chance", the teachings of which are incorporated herein by reference.

BACKGROUND

This invention relates to payout distributions for games of chance.

In a typical game of chance, a player plays the game repeatedly. For each play, he places something of value at risk and receives either no payout or a payout of value. The payout of value can be in any form. Some examples are coins, tokens, credits, or tickets. Each play can result in different levels of payout (for example, payouts at levels of $0, $10, $20, and $100) and each payout level has a probability. For example, each play may have a probability of 5% of producing a payout at the $100 level, a probability of 20% of a $20 payout, 20% for a $10 payout, and 55% for a payout of $0.

The different levels of payout and the probability of each payout level occurring on a given play is called the payout distribution. In some games, such as some card games, the payout distribution is determined by the rules of the game. In other games, such as typical mechanized games of chance (e.g., slot machines), the manufacturer or operator of the game (which we will call the house) can set the payout distribution (in the case of slot machines, the frequencies and payouts are expressed on a so called "par sheet.").

For example, if a slot machine has 30,000 possible reel positions, there are 30,000 equally possible outcomes for each play. Of these outcomes, a certain number are set to result in a particular payout amount. If 1800 of the possible outcomes are set to produce a payout of 5 coins, a player will win 5 coins in 6% of his plays. If 900 of the possible outcomes are set to produce a payout of 10 coins, a player will win 10 coins in 3% of his plays. The sum of the percentages for all of the possible non-zero payouts is called the hit rate.

The house typically offers multiple units of the game (e.g., rooms full of slot machines) to large numbers of players. The payout distribution to the players determines both the house hold (the average fraction of the payer's at-risk value which the house retains as gross profit) and the quality of the experience for players of the game.

Games having the same hold can produce widely different experiences for players.

For instance, consider two games which both have a hold of 10% and which require the player to risk one dollar to play. Suppose one game produces only a single $1,000,000 payout on average every 1.1 million plays and the other produces a single $10 payout on average every 11.1 plays. From the point of view of the house, these games are essentially the same in that the long-term hold is 10% of money that players put at risk.

However, the players of the two games have much different experiences.

The first game can provide the thrill of a potential million-dollar windfall, but very few people ever experience it. The second game provides a much more modest payout, but the payout is still ten times the price of a single play, and anyone can experience it if he is moderately persistent in playing. If each game is played once every ten seconds 24 hours per day, the first game produces an average of only 2.9 winners per year while the second game produces an average of 864 winners per day.

The gaming industry often characterizes games by their hold, their hit rate (the frequency with which a player wins a payout of any amount), and their volatility (the expected volatility in the percentage of hold as a function of the number of plays).

SUMMARY

In general, in one aspect, the invention features a method in which, based on a metric that represents a value of a game of chance, a payout distribution is optimized with respect to the metric.

Implementations of the invention may include one or more of the following features. The metric represents a quality of a player experience. The metric evaluates payouts for successive plays of the game, or the quality of experience for average players who receive more frequent payouts, or a fraction of players experiencing payouts in a succession of plays. The metric is chosen based on characteristics of particular player populations. The characteristic includes at least one of (a) location of game played, (b) time of day played, (c) amounts put at risk, and (d) identity of games played. The payout distribution includes a number of the payout levels, a frequency of payouts, or levels of payouts. The optimizing includes simulating a number of players. Different termination rules are applied for respective groups of the players, each of the termination rules defining when play of each of the players in the group will terminate. At least one of the termination rules provides for termination when a player has reached a predefined number of plays or when a player has experienced a predefined number of plays with no payouts. The metric includes the aggregate payout among all of the players or the aggregate number of plays of all of the players. The number of players is based on the frequency of payouts or on a specified accuracy to be achieved in the optimizing. The optimizing includes generating simulations of player experiences. The number of plays is based on the occurrence of a length of time elapsed during play. The number of plays is based on the depletion of an initial budget. The optimizing applies a genetic algorithm to the player experiences. The optimizing is based on predefined constraints. The constraints are associated with amounts of house hold.

Other advantages and features will become apparent from the following description and from the claims.

DESCRIPTION

Figure 5:
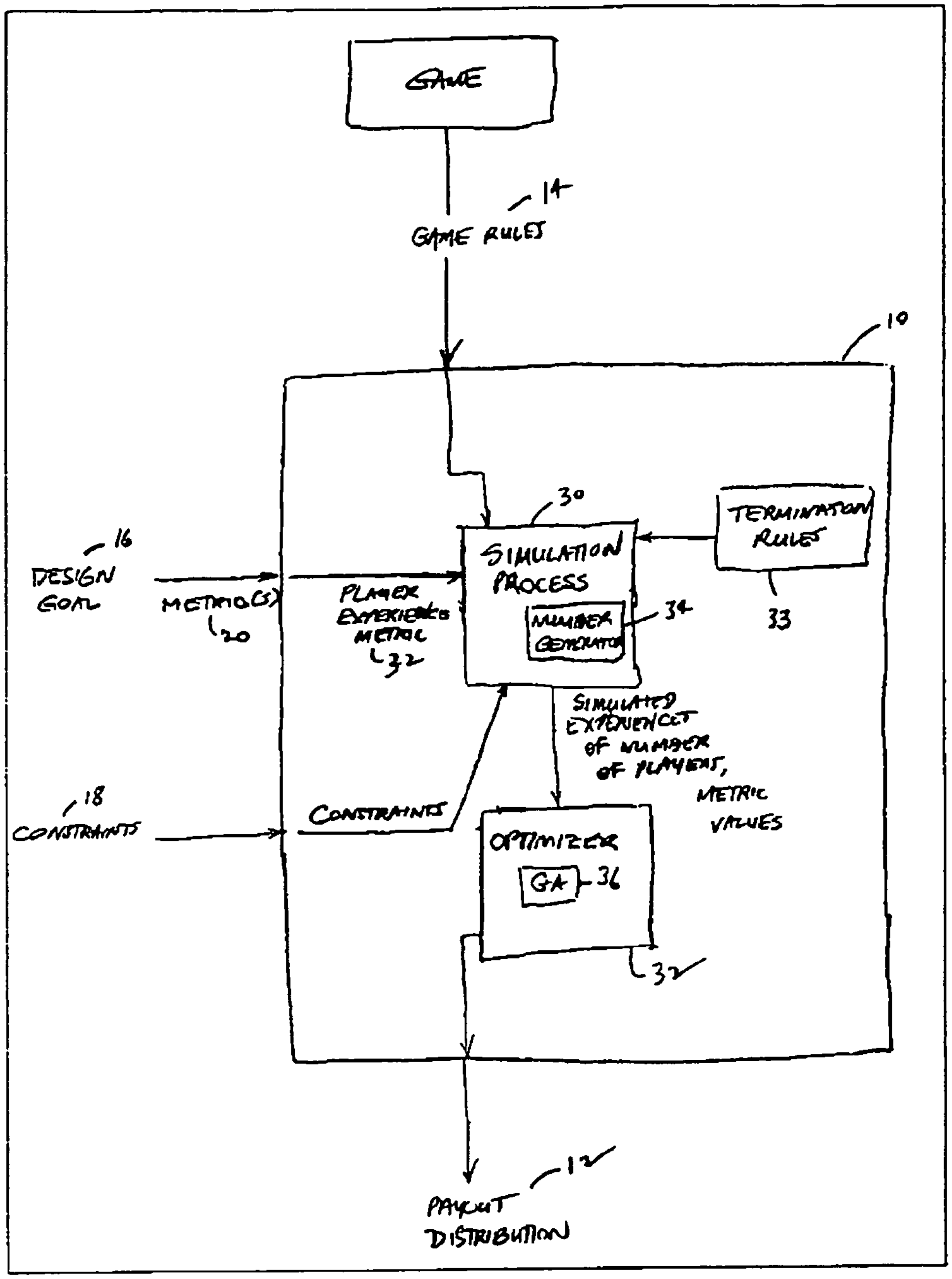
FIG. 5 is a block diagram.

As shown in FIG. 5, an optimization system 10 can be used to generate an optimized payout distribution 12 for a game of chance (defined by game rules 14) with respect to a user-specified design goal 16, without violating user-specified constraints 18. (By user, we are not referring to the player of the game but rather to the party that, for example, designs or configures the game.)

The design goal 16 could be to optimize (e.g., maximize) the payout distribution by determining the payout distribution that produces the highest value of a metric or combination of metrics 20 subject to meeting the contraints 18, for example, a minimum hold, a number of payout levels, or a minimum hit rate.

The optimization system 10 includes a simulation process 30 for simulating sequences of plays experienced by each of a number of players of the game. Such a sequence would, for a given player, represent the number of plays and the payout for each play, for example. Each sequence can be considered a player experience for the corresponding player. The simulation uses a pseudo-random number generator 34 to simulate the experiences of a large number of players.

Metrics

A wide range of different metrics can be used to represent the quality of a player experience. For example, the metric may represent the quality of the experience for an average player rather than the quality of experience for exceptional players who win rare payouts. The metrics may also include more than a final change in wealth experienced by the average player. They may also include events along the way that lend an enjoyable aspect to what the player should know is a losing game. Among the many possible metrics for player experience is the fraction of players experiencing winning "streaks" during their play. Furthermore, the appropriate metric will be different for different player populations who play at different games, locations, and times of day or who put different amounts of money at risk. These variations can also be considered in the optimization process. A player might be offered the option of different types of games (even within the same machine) that have been labeled in such a way that the player can select the game that provides the experience that he or she is seeking.

Termination Rules

The computation of metrics may take account of termination rules 33 that determine the conditions under which players quit playing the game. Different termination rules reflect different playing behaviors or different experiences being sought by players. For example, some players quit after a set number of plays or after a set number of plays with no payouts. Others do not quit until they have run out of money. The different rules mandate different payout distributions no matter which metric is being optimized. The simulation corresponding to a player's experience is continued for a number of plays until terminated according to a rule that is part of the metric. Such rules might be based, for example, on the payout experience (e.g., quit after no payouts in 20 plays) or time (e.g., quit after two hours) or money (e.g., quit when the budget is exhausted), or on more complicated combinations of these and other factors.

Number of Players Simulated

The number of players simulated depends on the frequency of the events, that is, the payouts upon which the metric is based, and on the desired accuracy of the result. For instance, if the metric is the number of players experiencing a rare payout, many simulations are required to measure the metric accurately. A smaller number of simulated players may be used for frequent events. The number of players being simulated may be varied from smaller numbers early in the process to larger numbers later as the optimizer (described below) gets closer to an optimal solution.

Optimizer

An optimizer 32 optimizes the payout distribution 12 to achieve the best value of one or more metrics and consistent with the constraints 18. In some implementations, the optimizer performs the optimization using a genetic algorithm (GA) 36 because of its good general convergence properties. Other algorithms may yield shorter computation times depending on the metric employed. The GA uses a vector to represent the payout distribution and adjusts that vector to optimize the metric while assuring that all proposed solutions of payout distributions are consistent with the constraints 18 imposed by the user.

The interplay between constraints and metrics can comply with a wide variety of design requirements. One could, for instance, require a specific hold and maximize a particular metric of the quality of player experience metric (as represented by the simulation) or conversely maximize the hold while maintaining any metric or set of metrics at a given level.

The system of FIG. 5 can be implemented using software, hardware, firmware, or some combination of them.

Slot Machine Example

An example of a practical application is the optimization of a slot machine.

One metric for a slot machine is the fraction of players experiencing at least a specified level of wealth at least at one point during the player experience. The level of wealth is expressed as a percentage of an initial budget (the amount of money that a given player is initially willing to put at risk). This metric assumes that players derive entertainment value from being ahead of the house (by some amount) at some point during their period of play even though they will lose some or all of that money in the end.

In a specific case, assume that each of 100,000 players begins with a budget of 1000 coins, plays two coins each time in each play, and quits after losing 1000 coins or playing 720 plays, whichever comes first.

Suppose that the user is interested in modifying an existing machine to operate according to a par sheet that has the same number of payouts as the existing machine while requiring the hold to increase from 5% to 6.5%.

The optimization system optimizes the payout distribution based on a set of simulated player experiences generated by the simulation process 30, each of them satisfying the constraints 18. The simulation process measures the quality of each player experience using the metric. The optimizer then optimizes the payout distribution to maximize the value of the metric.

In this example, we first show the result when the user wants to maximize the proportion of players who have, at some point during their period of play, accumulated at least 10% more than their initial stake (the budget). The accumulation of at least 10% more wealth is the metric. What is being optimized is the proportion of players who achieve at least that wealth.

Figure 1:
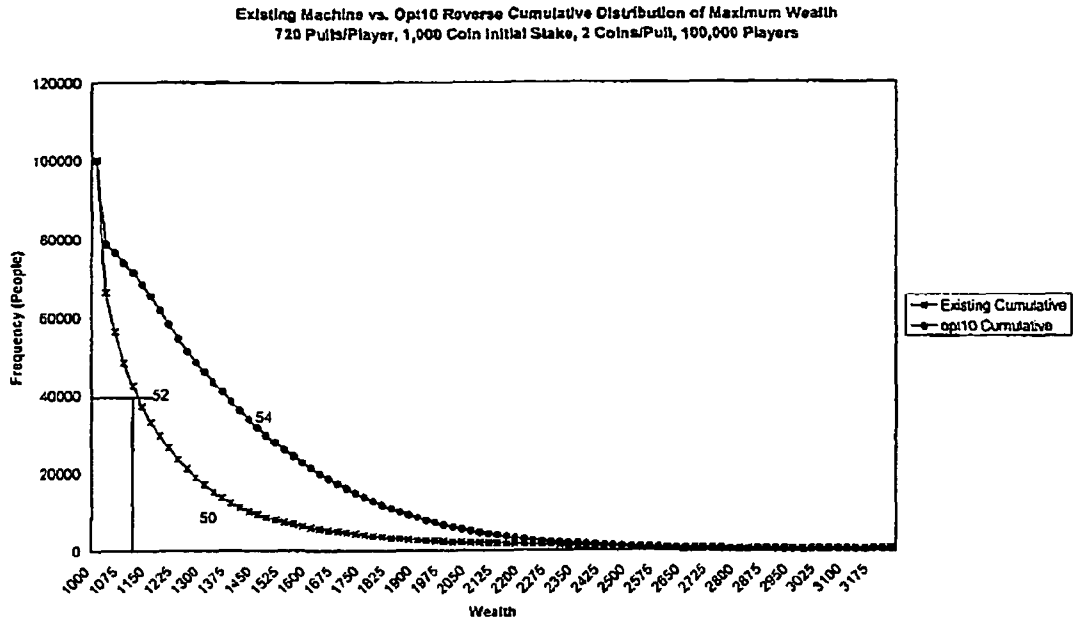
FIGS. 1 through 4 are graphs.

In FIG. 1, the curve 50 marked with x's represents the cumulative numbers of players (arrayed along the y-axis) who achieve specific wealth levels (arrayed along the x-axis) at some point during play using the original machine. For example, point 52 represents 40,000 players each achieving a wealth of at least 1150 coins at some point during play. The curve demonstrates that almost no players would achieve a wealth of at least 3000 coins while all 100,000 players would achieve a wealth of 1000 coins or more (which they must given than they all start with 1000 coins).

Figure 2:
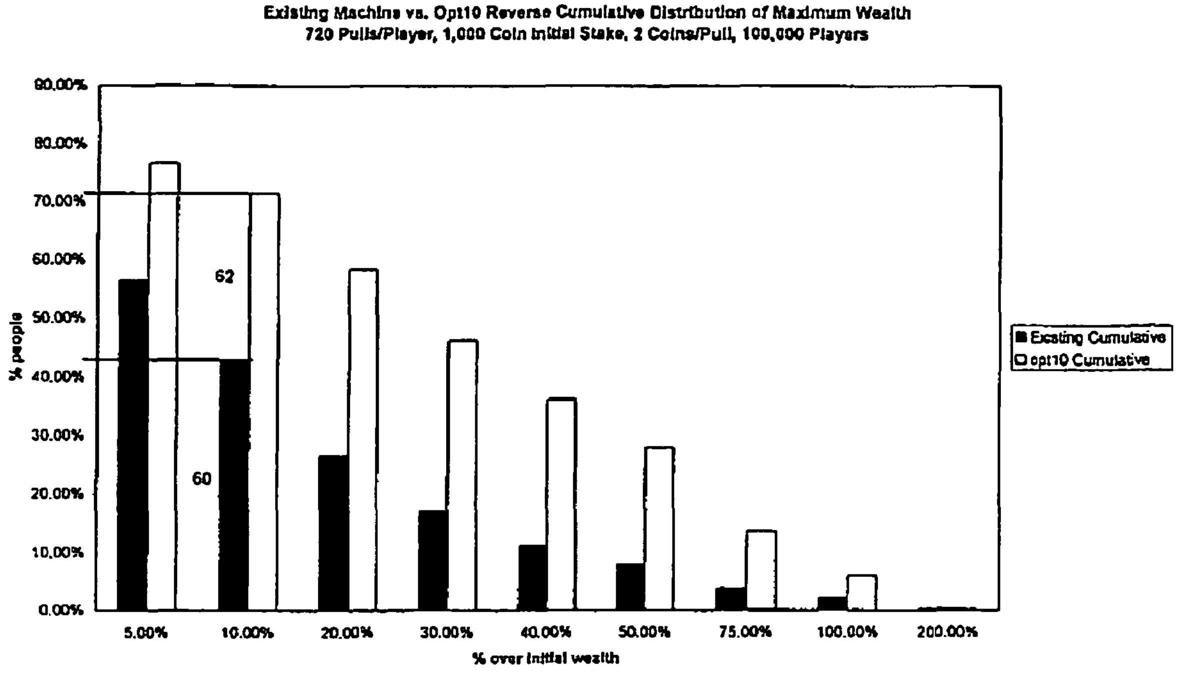

In FIG. 2, the shaded bars represent the cumulative distribution of maximum wealth as a function of the percentage of the maximum wealth above the initial budget. For example, bar 60 represents the 43% of the players who at some point during their play achieve a maximum wealth of 1100 coins, 10% over the initial budget.

The bulleted curve 54 in FIG. 1 and the unshaded bars in FIG. 2 represent similar information for a modification of the machine intended to achieve better player experience compared to the original machine by optimization of a metric of player experience.

As shown, the cumulative distribution of maximum wealth has been adjusted to increase the proportion of players who achieve relatively smaller maximum wealths while reducing the proportion of players who achieve relatively very large maximum wealths.

For example, the bar 62 on FIG. 2 represents the fact that, in the optimized game, 71% of the players will achieve a wealth of 1100 coins, a much higher percentage than for the original machine.

Figure 3:
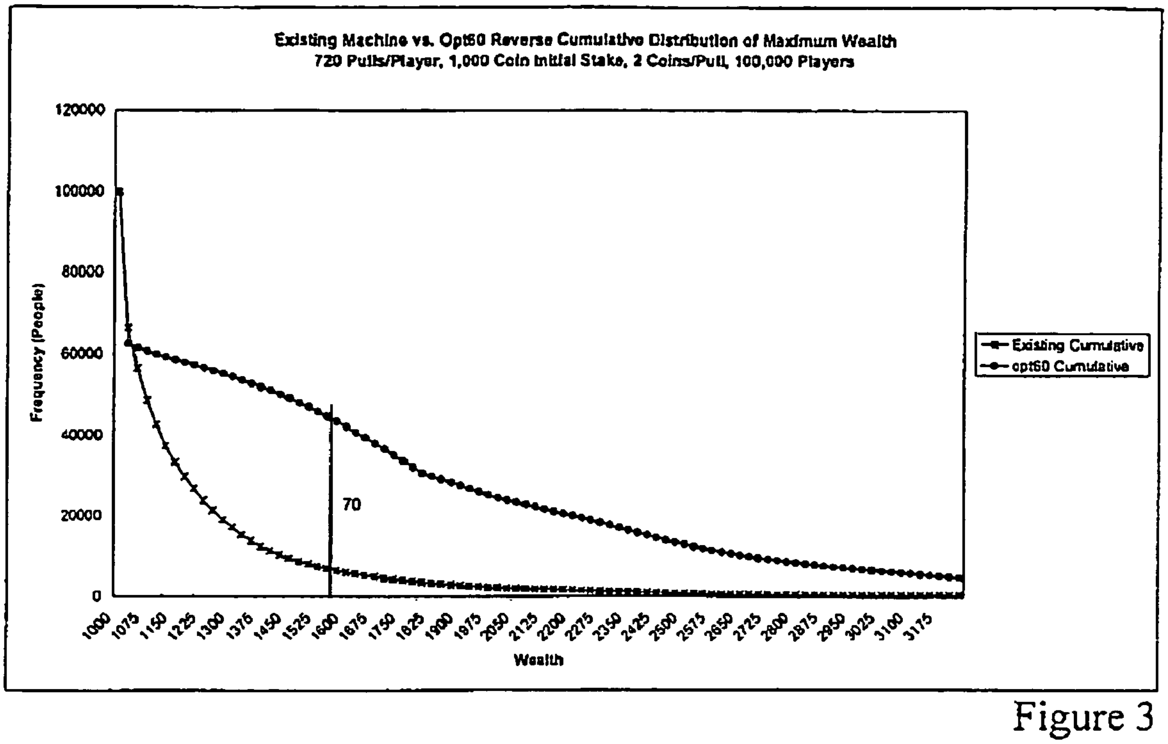
Figure 4:
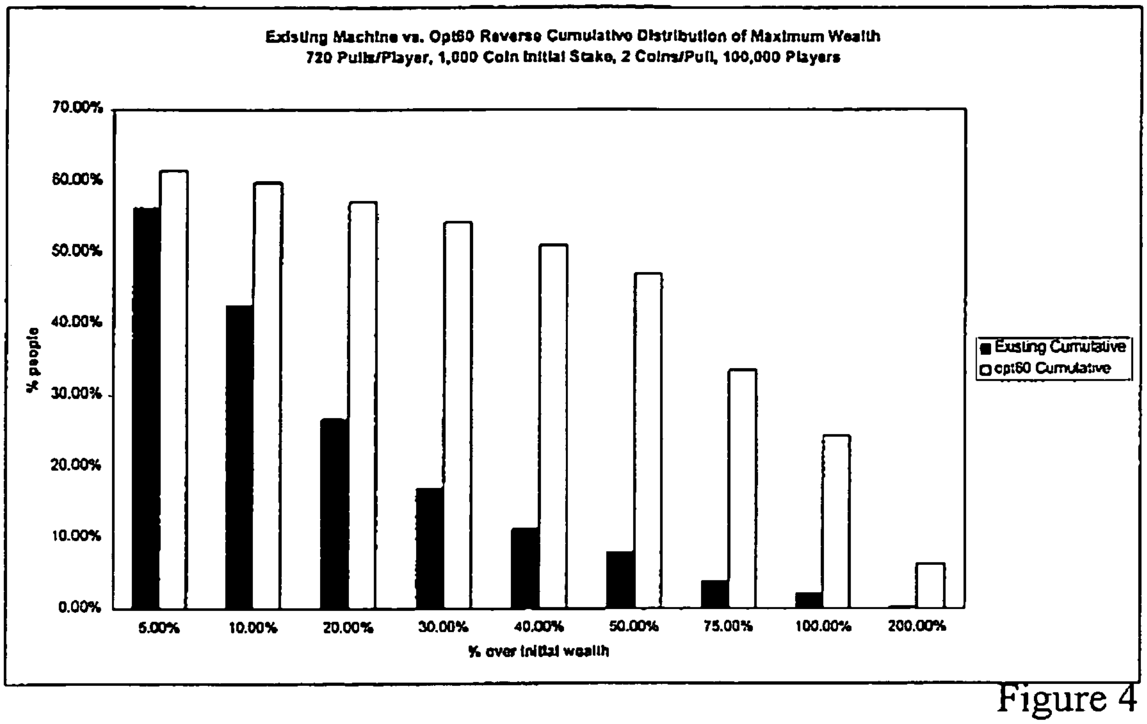

In FIGS. 3 and 4, the user has optimized the par sheet to maximize the fraction of players experiencing at least a 60% surplus over their initial stake. The result is even more different than in the original machine curves of FIGS. 1 and 2 in that more than seven times as many players have that experience than for the initial game (as seen by the points on the two curves at the 1600 coin level represented by vertical line 70 on FIG. 3).

In both of these examples, the hold was also increased from 5.0% to 6.5%, illustrating that it is possible to improve the players' experiences while achieving greater revenue for the house.

The metric given in the example may not actually be the best metric to use for designing a slot machine payout distribution because it may not effectively characterize the entertainment value that players receive from playing slot machines. Better metrics could be determined based on research in gambling behavior. Whatever metrics are deemed useful can be applied in the optimization method discussed above to design useful games.

Other implementations are within the scope of the following claims.

For example, for almost any metric that can be developed, it is possible to increase the value of the player experience while maintaining or increasing the hold. Furthermore, different metrics can and should be used to optimize the experience for different players based on the places, times, and types of machines they play as well as the amount of money they put at risk.

The invention claimed is:

1. A method comprising based on a metric that comprises a characteristic of an aggregate number of payouts experienced by players in a game of chance, optimizing, with a processor, a payout distribution based on a set of simulated player experiences with respect to the metric;

wherein a simulated player experience comprises a sequence of a plurality of plays and corresponding payouts experienced by a single simulated player playing according to a given payout distribution; and adjusting the aggregate number of payouts of the game of chance based at least in part on the optimization.

2. The method of claim 1 where the metric comprises a desired pattern of payouts experienced by simulated players.

3. The method of claim 1 where the metric comprises a maximum accumulated wealth obtained by the simulated player during the sequence of a plurality of plays and corresponding payouts.

4. The method of claim 1 where the metric comprises a fraction of players experiencing consecutive payouts in a succession of plays.

5. The method of claim 1 where the metric is chosen based at least in part on at least one of location of game played, time of day played and identity of games played.

6. The method of claim 1 where the optimizing includes simulating a sequence of a plurality of plays and corresponding payouts experienced by a number of players.

7. The method of claim 6 where metric comprises the aggregate number of plays of all the players.

8. The method of claim 6 comprising applying different termination rules for respective groups of players, each of the termination rules defining when the simulated sequence of a plurality of plays and corresponding payouts for each of the players in the group will terminate.

9. The method of claim 8 where at least one of the termination rules provides for termination of the simulated sequence of a plurality of plays and corresponding payouts when a player has reached a predefined number of plays.

10. The method of claim 8 where at least one of the termination rules provides for termination of the simulated sequence of a plurality of plays and corresponding payouts when a player has experienced a predefined number of plays with no payouts.

11. The method of claim 8 where the metric comprises the aggregate payout among all of the players.

12. The method of claim 8 where at least one of the termination rules provides for termination of the simulated sequence of a plurality of plays and corresponding payouts based on the depletion of an initial budget.

13. The method of claim 1 where the optimizing applies a genetic algorithm to the player experiences.

14. The method of claim 1 where the optimizing is performed based at least in part on constraints that are associated with amounts of house hold.

15. The method of claim 1 where the game of chance comprises a slot machine.

16. A non-transitory computer-readable medium storing computer executable instructions that when executed by a computer cause the computer to perform a method, the method comprising:

based on a metric that comprises a characteristic of an aggregate number of payouts experienced by players in a game of chance, optimizing, with a processor, a payout distribution based on a set of simulated player experiences with respect to the metric; and wherein a simulated player experience comprises a sequence of a plurality of plays and corresponding payouts experienced by a single simulated player playing according to the aggregate number of payouts.

17. The computer-readable medium of claim 16 where the metric comprises a desired pattern of payouts experienced by simulated players.

18. The computer-readable medium of claim 16 where the metric comprises a maximum accumulated wealth obtained by the simulated player during the sequence of a plurality of plays and corresponding.

19. The computer-readable medium of claim 16 where the metric comprises a fraction of players experiencing consecutive payouts in a succession of plays.

20. The computer-readable medium of claim 16 where the metric is chosen based at least in part on at least one of location of game played, time of day played and identity of games played.

21. The computer-readable medium of claim 16 where the optimizing includes simulating a sequence of a plurality of plays and corresponding payouts experienced by a number of players.

22. The computer-readable medium of claim 21 comprising applying different termination rules for respective groups of players, each of the termination rules defining when the simulated sequence of a plurality of plays and corresponding payouts for each of the players in the group will terminate.

23. The computer-readable medium of claim 22 where at least one of the termination rules provides for termination of the simulated sequence of a plurality of plays and corresponding payouts when a player has reached a predefined number of plays.

24. The computer-readable medium of claim 22 where at least one of the termination rules provides for termination of the simulated sequence of a plurality of plays and corresponding payouts when a player has experienced a predefined number of plays with no payouts.

25. The computer-readable medium of claim 22 where the metric comprises the aggregate payout among all of the players.

26. The computer-readable medium of claim 22 where metric comprises the aggregate number of plays of all the players.

27. The computer-readable medium of claim 22 where at least one of the termination rules provides for termination of the simulated sequence of a plurality of plays and corresponding payouts based on the depletion of an initial budget.

28. The computer-readable medium of claim 16 where the optimizing applies a genetic algorithm to the player experiences.

29. The computer-readable medium of claim 16 where the optimizing is performed based at least in part on constraints that are associated with amounts of house hold.

* * * * *

UNITED STATES PATENT AND TRADEMARK OFFICE

CERTIFICATE OF CORRECTION

PATENT NO. : 7,850,516 B2
APPLICATION NO. : 11/171062
DATED : December 14, 2010
INVENTOR(S) : Peter Gaidarev et al.

It is certified that error appears in the above-identified patent and that said Letters Patent is hereby corrected as shown below:

In column 2, line 60, delete “contraints” and insert -- constraints --, therefor.

Signed and Sealed this
Sixteenth Day of August, 2011

David J. Kappos
*Director of the United States Patent and Trademark Office*